US012680333B2

(12) United States Patent
Goodin

(10) Patent No.: US 12,680,333 B2
(45) Date of Patent: Jul. 14, 2026

(54) APPARATUS AND METHODS FOR PROVIDING HIGHLY PORTABLE AND EASILY ERECTABLE FENCING

(71) Applicant: SPORTAFLEX LLC, Mesa, AZ (US)

(72) Inventor: Terry Lynn Goodin, Mesa, AZ (US)

(73) Assignee: SPORTAFLEX LLC, Mesa, AZ (US)

( * ) Notice: Subject to any disclaimer, the term of this patent is extended or adjusted under 35 U.S.C. 154(b) by 139 days.

(21) Appl. No.: 18/927,219

(22) Filed: Oct. 25, 2024

(65) Prior Publication Data

US 2025/0137287 A1 May 1, 2025

Related U.S. Application Data

(60) Provisional application No. 63/546,036, filed on Oct. 27, 2023.

(51) Int. Cl.

*E04H 17/18* (2006.01)
*F21S 4/00* (2016.01)
*F21V 33/00* (2006.01)
*F21Y 115/10* (2016.01)

(52) U.S. Cl.

CPC .............. *E04H 17/185* (2021.01); *F21S 4/00* (2013.01); *F21V 33/006* (2013.01); *F21Y 2115/10* (2016.08)

(58) Field of Classification Search

CPC .......... E04H 17/185; E04H 17/18; F21S 4/00; F21V 33/006; F21Y 2115/10

See application file for complete search history.

(56) References Cited

U.S. PATENT DOCUMENTS 57,408 A * 8/1866 Terry ...................... E04H 17/18 256/31
5,180,143 A * 1/1993 Brower .................. A63C 19/06 256/19
5,779,227 A * 7/1998 Elkins ..................... E04H 17/18 256/26
5,863,030 A * 1/1999 Kotler ..................... E04H 17/18 256/26
8,302,937 B2 * 11/2012 Mettler ................. E01F 13/022 256/60
9,822,549 B2 * 11/2017 Gentry .................. E01F 13/022
10,265,601 B1 * 4/2019 Baker .................. A63B 71/023
11,371,258 B2 * 6/2022 Goodin ................. E04H 17/009

(Continued)

FOREIGN PATENT DOCUMENTS

CN 206829778 U * 1/2018
EP 3677319 A1 * 7/2020 ........... A63B 63/004

(Continued)

*Primary Examiner* — William L Miller

(74) *Attorney, Agent, or Firm* — Weintraub Tobin; Eric Caligiuri

(57) ABSTRACT

Apparatuses, systems, and methods for easily shipping, deploying, and removing temporary and portable fencing suitable for sports and recreational events is disclosed. The free standing and easily portable fence system disclosed herein comprises flexible barrier netting supported at intervals by a foldable rigid frame. Sections of the foldable rigid frame are connected in such a manner as to allow them to be rotated horizontally at least 90 degrees in either direction. Also included for stability are foldout legs at the ends of the foldable rigid frame. A strut can also be used to enhance safety and stability.

20 Claims, 12 Drawing Sheets

(56) References Cited

U.S. PATENT DOCUMENTS

| | | | | |
|---|---|---|---|---|
| 12,338,649 | B2 * | 6/2025 | Dunning-Gill | E04H 17/006 |
| 2006/0277823 | A1 * | 12/2006 | Barnett | F21V 21/088 47/33 |
| 2007/0170411 | A1 * | 7/2007 | Ribak | E01F 13/022 256/32 |
| 2015/0308058 | A1 * | 10/2015 | Boyce | E04H 12/2253 256/32 |
| 2017/0009485 | A1 * | 1/2017 | Gentry | E01F 13/022 |
| 2018/0238002 | A1 * | 8/2018 | Wahlin | E04H 17/18 |
| 2019/0226232 | A1 * | 7/2019 | Goodin | E04H 12/2276 |
| 2019/0344148 | A1 * | 11/2019 | Miller | E04H 17/185 |
| 2020/0056862 | A1 * | 2/2020 | Howe | E04H 17/163 |
| 2020/0149734 | A1 * | 5/2020 | Arai | E04H 17/1413 |
| 2022/0205273 | A1 * | 6/2022 | Vingerhoets | E04H 17/185 |
| 2022/0259886 | A1 * | 8/2022 | Chase | E04H 17/1602 |
| 2023/0324150 | A1 * | 10/2023 | van Riel | F41H 5/08 89/36.01 |
| 2023/0337626 | A1 * | 10/2023 | Chen | E04H 17/185 |
| 2024/0254802 | A1 * | 8/2024 | Drost | E04H 17/163 |
| 2024/0416162 | A1 * | 12/2024 | Lucarelli, III | A62C 3/0257 |
| 2025/0250818 | A1 * | 8/2025 | Zwierzykowski | E04H 17/185 |

FOREIGN PATENT DOCUMENTS

| | | | | |
|---|---|---|---|---|
| ES | 1068253 | U * | 9/2008 | |
| GB | 2349900 | A * | 11/2000 | E04H 17/1413 |

* cited by examiner

APPARATUS AND METHODS FOR PROVIDING HIGHLY PORTABLE AND EASILY ERECTABLE FENCING

CROSS-REFERENCE TO RELATED APPLICATIONS

This application claims priority under 35 U.S.C. Section 119(e) to U.S. Provisional Patent Application No. 63/546,036, entitled "Apparatus and Methods for Providing Highly Portable and Easily Erectable Fencing" and filed on Oct. 27, 2023, the entire disclosure of which is incorporated herein by reference.

FIELD OF THE INVENTION

The present disclosure relates to apparatus, systems, and methods for a temporary and portable fence suitable for sports and other recreational events.

BACKGROUND

Temporary portable fencing for multi-use properties has long been a challenge for owners of public spaces, such as at schools, parks, and similar facilities. This challenge arises for a variety of reasons, including the conflicting requirements of strength and durability versus convenience and ease-of-use.

More recently, limited space and budgetary considerations are driving a trend toward multiuse facilities, with the attendant need for flexibility in the placement of the fences. While various temporary or portable fencing systems have been proposed to meet these requirements, there still presently exists a need for a temporary portable fencing system that is at the same time strong and durable while also being easy to erect and disassemble, and highly adaptable as to the placement of the fence.

Furthermore, user safety is also an important consideration, especially when the fencing is used in conjunction with sporting events such as baseball, football, and soccer. Moreover, current metal frame designs make it difficult for fences to safely conform to uneven mounting surfaces.

The invention described herein overcomes many of the deficiencies in prior art temporary portable fencing. These and other considerations have led to a new portable fence design that better incorporates these considerations.

SUMMARY OF THE INVENTION

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

The inventive free standing and easily portable fence system disclosed herein comprises flexible barrier netting supported at intervals by a foldable rigid frame. The sections of the foldable rigid frame are connected in such a manner by bolts and connection washers to allow them to be rotated horizontally at least 90 degrees in either direction. Also included for stability are foldout legs at the ends of the foldable rigid frame and a foldable middle bar.

Flexible barrier netting is constructed with a synthetic polymer such as polyethylene, polyester, or Nylon netting. Flexible barrier netting is connected to the foldable rigid frame with a plurality of connectors, such as plastic connectors, through a plurality of holes at regular intervals around the flexible barrier netting and through a second plurality of holes at regular intervals in the foldable rigid frame.

The foldable rigid frame, foldout legs, and foldable middle bar may be constructed of powder coated or galvanized steel angle construction materials that are light weight but robust and will not deteriorate over time. Aluminum or other suitable materials known in the art can also be used.

In one embodiment, a safety feature is contained within the portable fence system allows the flexible barrier netting to break away from the foldable rigid frame, in the event of a collision from a sports player, thereby reducing the risk of injury. Rather than the entire portable fence system tipping over upon collision, only the plastic connectors break, leaving the foldable rigid frame upright. In this embodiment, plastic connectors can comprise zip-ties that are chosen based on size to break upon an impact less than that sufficient to tip the portable fence system over.

In another embodiment, a strut such as a gas piston rod or gas spring can be installed in the foldout legs between the side of the frame and the leg. This will allow the fence to yield under pressure, then right itself to its original position, thus enhancing the safety of the fencing system. In one embodiment, the gas piston rod or gas spring can be approximately two to three feet in length with approximately one-hundred pounds of compression force.

In another embodiment, multiple foldable rigid frame sections can be elastically and flexibly attached together to not only soften impact from a player or other pedestrian colliding into it, but also essentially fully return the impacted frame sections to their previous positions after impact. In one embodiment, this can be done using Velcro or elastic fasteners to hold the sections together.

In another embodiment, lights, such as an LED rope light or string, can be added to the top of the foldable rigid frame. In one embodiment, the LED lights can be powered by either battery or solar power. In one embodiment, small pin holes can be added along the top of the frame to allow some low light to filter to the outside, thereby enhancing viewing and safety at night. In one embodiment, the LED rope light or string can be about thirty feet in length with a maximum brightness level around two-hundred lumens.

The portable fence system disclosed herein is more quickly deployed and removed from the playing field, while also being more conveniently stored for shipping in storage boxes, which reduces storage and shipping costs.

Two or more rectangular rigid sections of the foldable rigid frame may be connected together at the top and/or bottom of each vertical element of the frame semi-permanently by bolts and a large connection washer to allow horizontal rotation so as to allow a fence of any practicable length and degree of curvature appropriate to the particular sports or recreational activity and purpose it is intended to serve. Some of the rectangular rigid sections may be held together at regular intervals by means such as Velcro, zip ties, or similar means that yield or release upon impact by a player.

The new apparatus, system, and method of deployment described herein offers a fixed frame barrier design that, in typical applications, is free-standing requiring no preinstalled ground anchoring devices.

Being free-standing allows for greatly expanded flexibility as to positioning, requiring essentially no penetration of the ground or grassy areas as are commonly used for sports and recreation events such as baseball, soccer, softball, or other sports and events.

Typical dimensions for each portable fence system can be dimensioned as appropriate for the application, but in one embodiment, can be in the 3.5-5.5 foot range in vertical height and in the range of 9.5-10.5 feet in horizontal length, depending on the application.

In addition to sports and recreation applications, the expanded range of applications for the disclosed invention include use on many types of surfaces, including grass, concrete and asphalt. In various embodiments, alternative uses include crowd control for events such as concerts, graduations, parking lot blockades, and other public events requiring some degree of crowd control. These alternative uses are all possible since the portable fence system can create a stable, free-standing barrier that does not require any permanent ground attachments requiring penetration holes or sleeves on surfaces such as asphalt or concrete.

Retrieval of the portable fence system disclosed herein is also easily facilitated and stored in multiple numbers for added convenience and reduced storage and shipping costs. It also requires no expensive pre-installed ground mounts since the unfolded portable fence system becomes free-standing.

While certain embodiments of the inventions are described in further detail below, it will be understood that the embodiments described herein are by way of example only. Accordingly, the inventions should not be limited based on the described embodiments. Rather, the scope of the inventions described herein should only be limited in light of the claims that follow when taken in conjunction with the above description and accompanying drawings.

Other objects, features, and advantages of the present invention will become apparent upon consideration of the following detailed description and the accompanying drawings.

BRIEF DESCRIPTION OF THE DRAWINGS

Features, aspects, and embodiments of the inventions are described in conjunction with the attached drawings, in which.

DETAILED DESCRIPTION OF THE INVENTION

The following is a detailed description of embodiments to illustrate the principles of the invention. The embodiments are provided to illustrate aspects of the invention, but the invention is not limited to any embodiment. The scope of the invention encompasses numerous alternatives, modifications, and equivalents. The scope of the invention is limited only by the claims.

While numerous specific details are set forth in the following description to provide a thorough understanding of the invention, the invention may be practiced according to the claims without some or all of these specific details.

Various embodiments will be described in detail with reference to the accompanying drawings. Wherever possible, the same reference numbers are used throughout the drawings to refer to the same or like parts. References made to particular examples and implementations are for illustrative purposes and are not intended to limit the scope of the claims.

Figure 1:
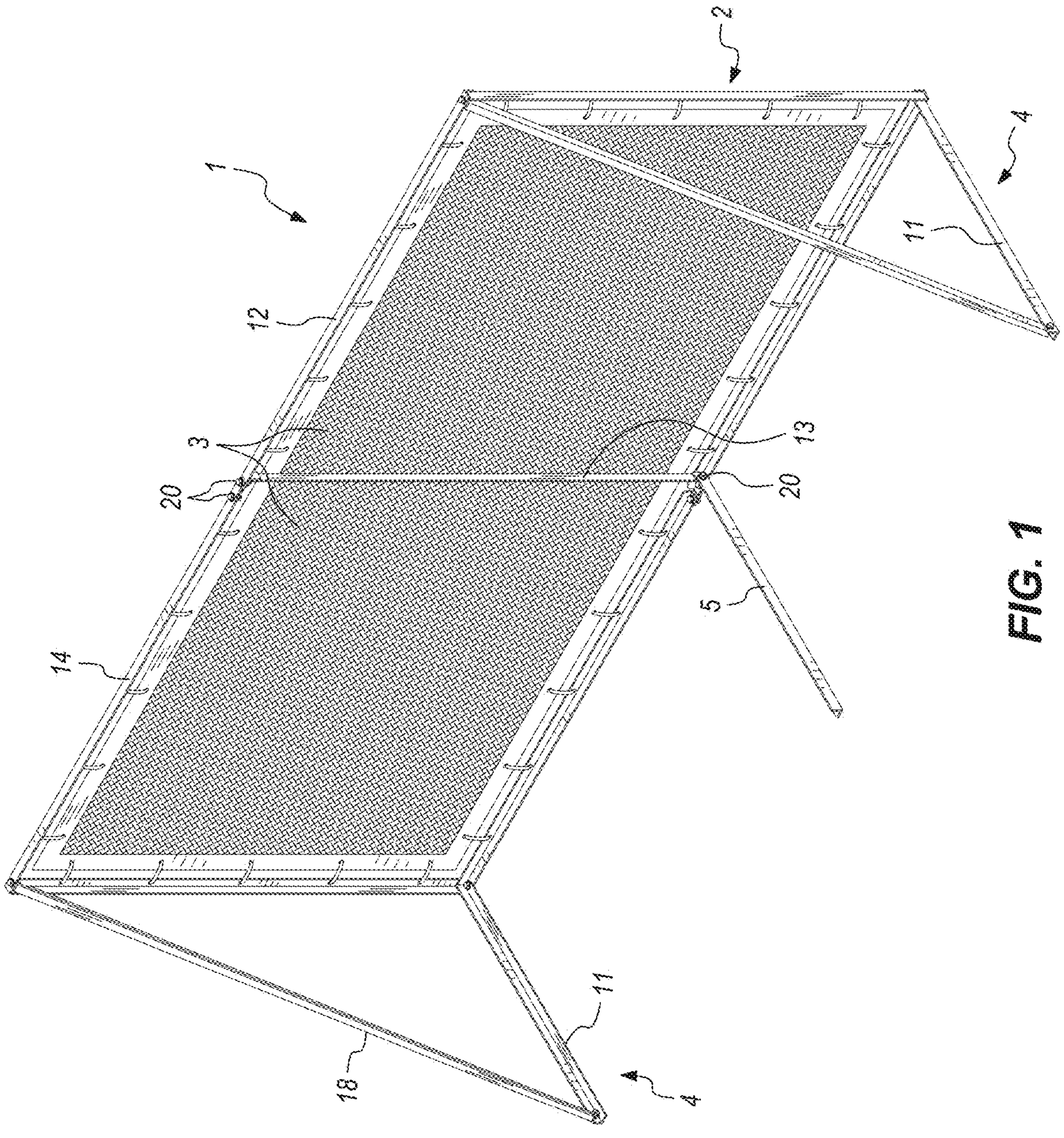
FIG. 1 shows a perspective view of one example embodiment of a portable fence system in the fully extended position.
Figure 2:
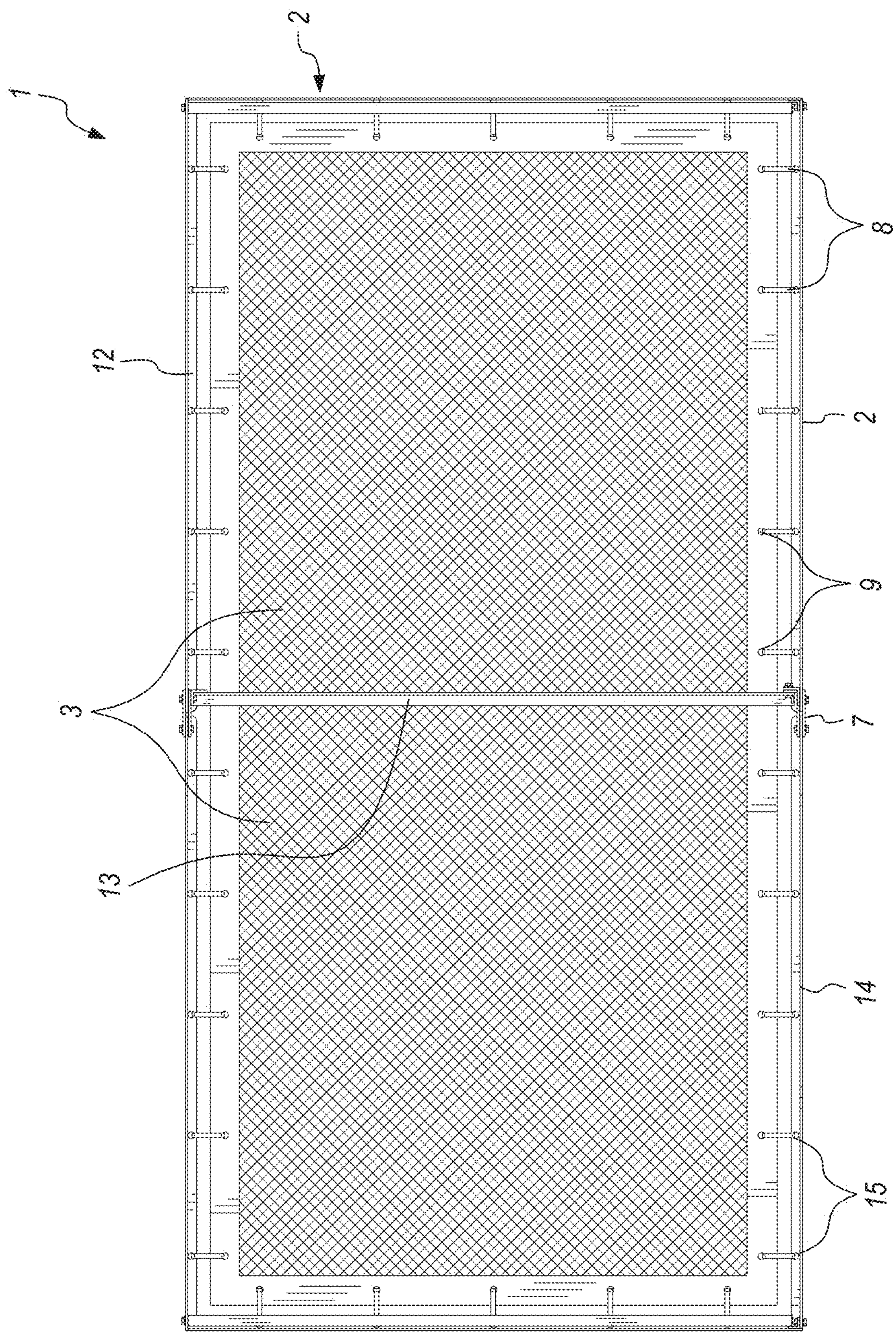
FIG. 2 shows one example embodiment of a portable fence system in the fully extended position.

FIGS. 1 and 2 show one example embodiment of portable fence system 1 in the fully extended position. Portable fence system 1 can be placed in the fully extended position using folding fence deployment process 100 for deploying folding fence system 1 for use at a sporting event, recreational activity, or other application.

Portable folding fence system 1 comprises a foldable rigid frame 2, flexible barrier netting 3, a foldout leg 4 at each end of the foldable rigid frame 2, and foldable middle bar 5 towards the middle of foldable rigid frame 2.

Flexible barrier netting 3 is connected to foldable rigid frame 2 with a plurality of connectors 8 through a plurality of holes 9 at regular intervals around flexible barrier netting 3 and through a second plurality of holes 15 at regular intervals in foldable rigid frame 2. In an alternative embodiment, connectors 8 can go around foldable rigid frame 2 at regular intervals instead of through holes 15 in foldable rigid frame 2.

In one embodiment, connectors 8 can comprise plastic connectors such as specifically sized zip-ties that can reduce the risk of injury by breaking away from frame 2 portable folding fence system 1 in the event of a collision from a sports player or other person, thereby reducing the risk of injury. Rather than the entire frame tipping over upon collision, only the plastic connectors break, leaving the foldable rigid frame upright.

Figure 9:
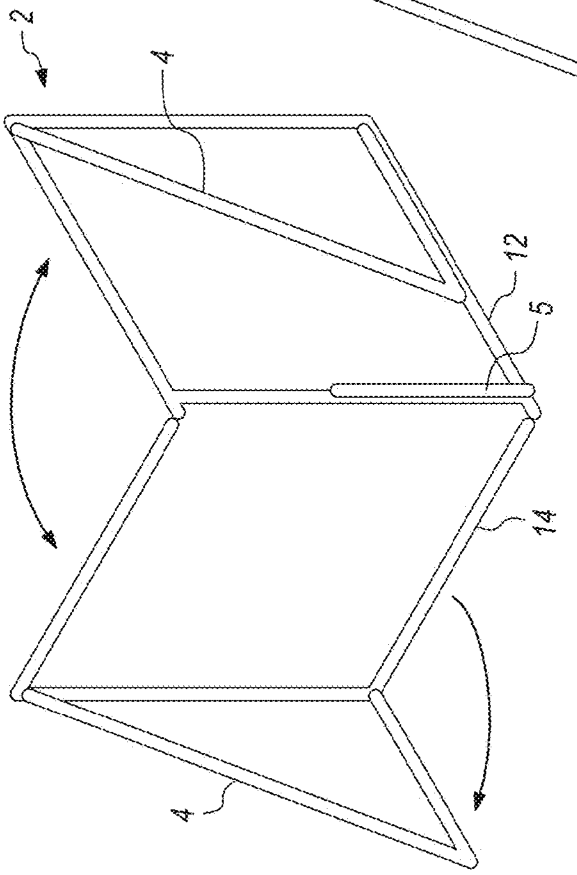
FIG. 9 is a perspective views of one example embodiment of a foldable rigid frame with foldout legs and middle bar for a portable fence system in partially folded position.
Figure 10:
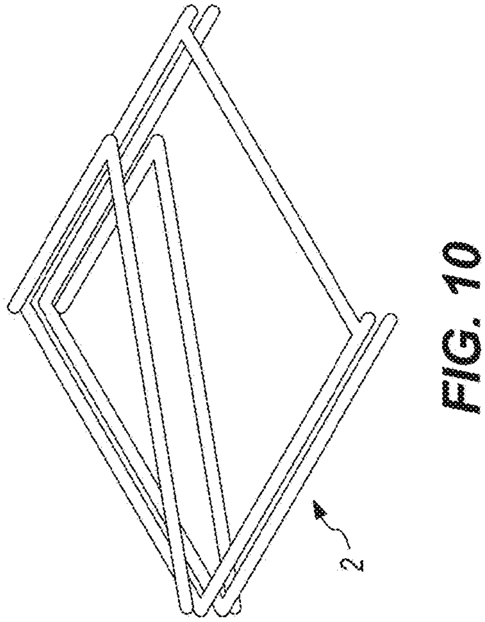
FIG. 10 is a perspective views of one example embodiment of a foldable rigid frame with foldout legs and middle bar for a portable fence system in a fully folded position.

Foldable rigid frame 2 comprises center bar 13, a first section 12, and a second section 14. First section 12 and second section 14 are connected together with bolts 20 and large connection washers 7 (FIG. 6) to allow first section 12 and second section 14 to each be rotated horizontally at least 90 degrees as shown in FIGS. 7 and 9. This rotation of first section 12 and second section 14 allows portable fence system 1 to be put into a fully folded position as shown in FIG. 10 using the folding fence take-down process 200 for folding fence system 1 shown in FIG. 13.

When portable fence system 1 is in a fully folded position, this allows portable fence system 1 to be more quickly deployed and removed from an installation location, while also being more conveniently stored in boxes for shipping and storage.

First section 12 and second section 14 can also each be rotated horizontally during installation by as much as 90 degrees so as to allow a degree of curvature appropriate to the particular sports or recreational activities appropriate to the purpose it is intended to serve.

Figure 6:
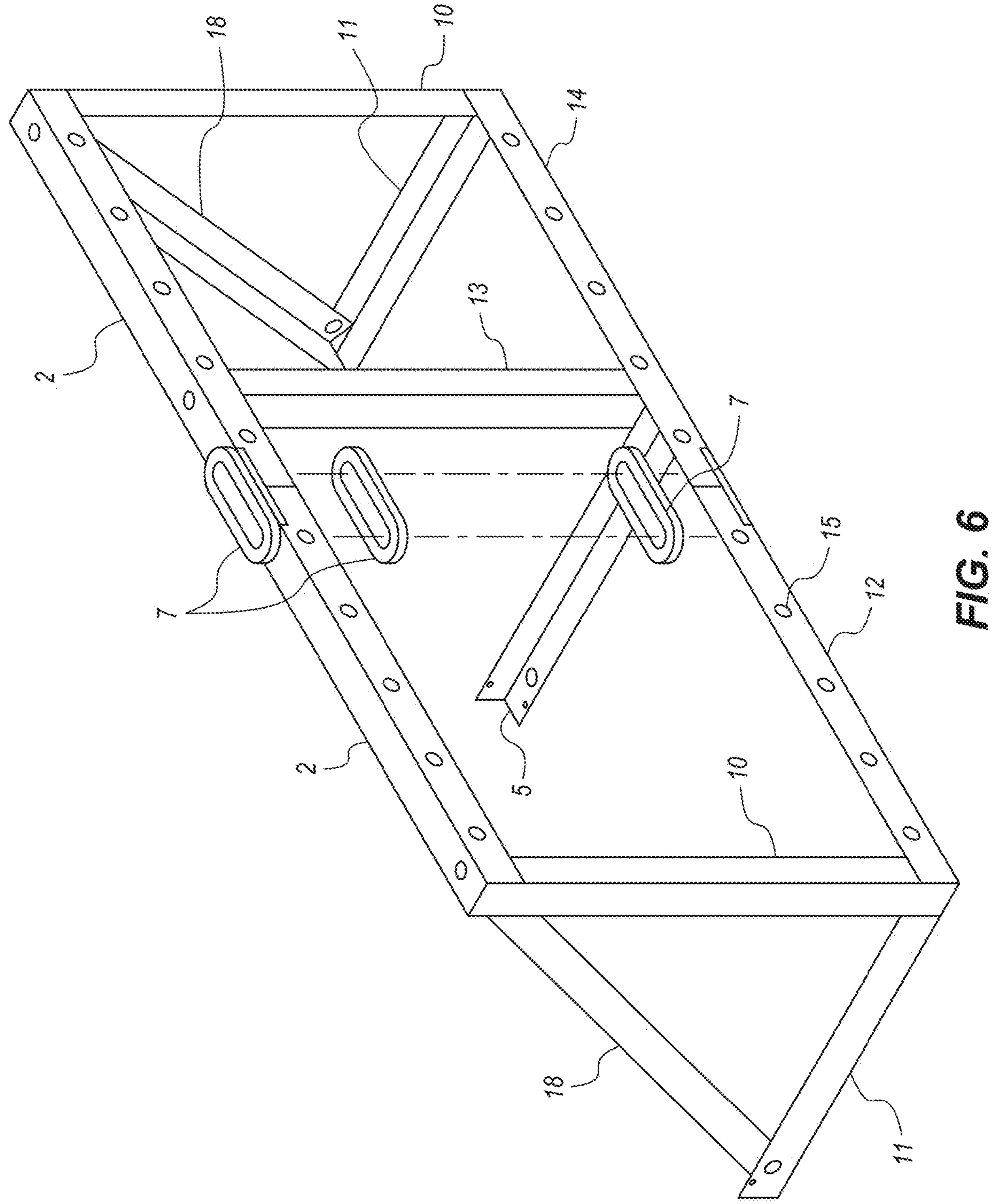
FIG. 6 shows a perspective view of one example embodiment of foldable rigid frame with foldout legs and middle bar for a portable fence system in a fully folded position.
Figure 7:
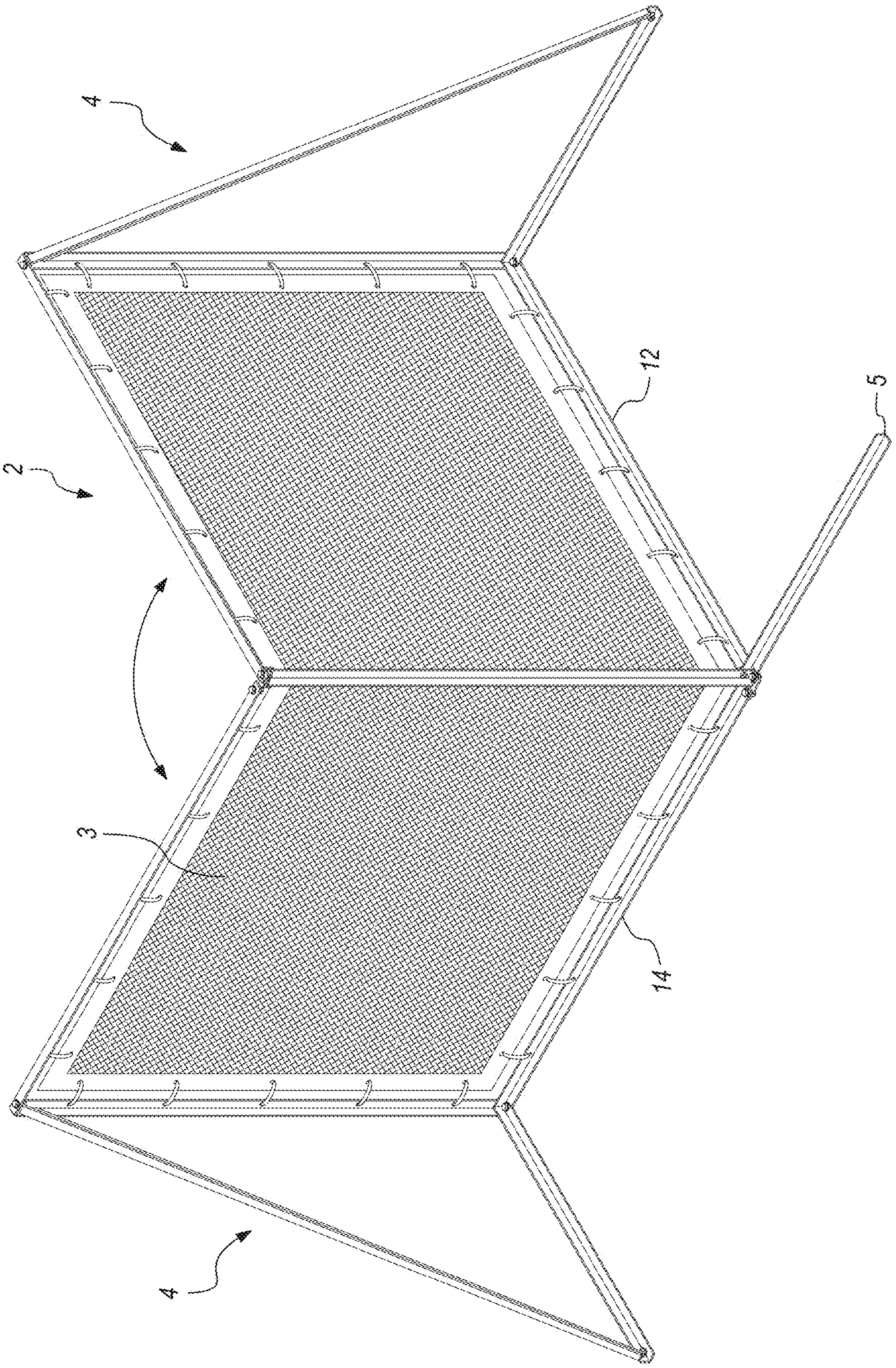
FIG. 7 is a perspective view of one example embodiment of a portable fence system with a first section rotated at an angle of 90 degrees.

Large connection washers 7 and bolts 20 hold first section 12 and second section 14 together as shown in FIG. 6.

Figure 5:
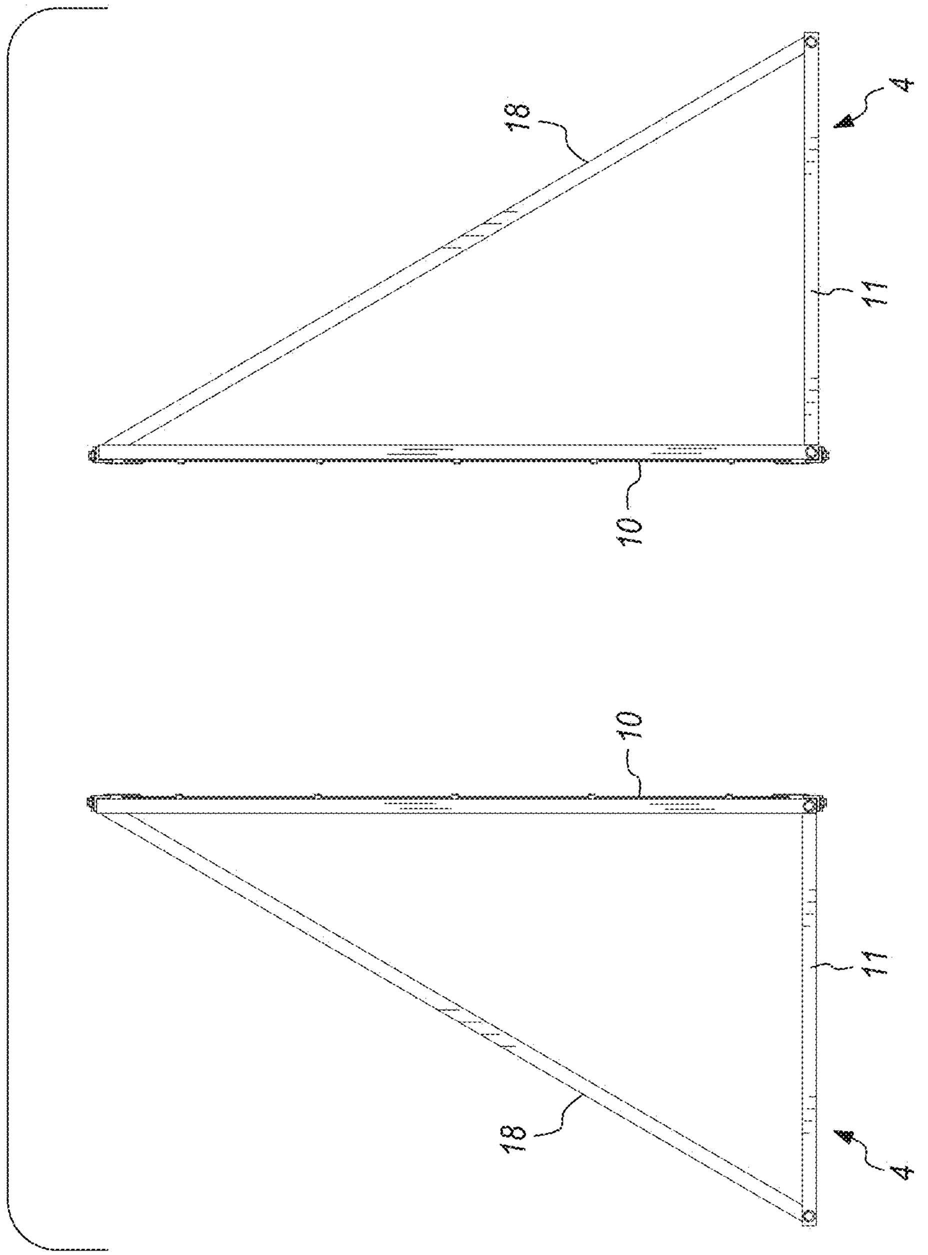
FIG. 5 shows a first side view of one example embodiment of a foldout leg for a portable fence system.

Foldout leg 4 comprises ground piece 11 and support bar 18 as shown in FIG. 5.

In one exemplary embodiment, foldable rigid frame 2, foldout leg 4 and foldable middle bar 5 may all be constructed of powder coated or galvanized steel angle construction material that is light weight but robust and will not deteriorate over time. In other embodiments, Aluminum or other suitable materials known in the art can also be used for construction.

In one example embodiment, flexible barrier netting 3 is constructed of a synthetic polymer such as polyethylene, polyester, or nylon netting. Connectors 8 can be zip ties, Velcro, or other similar synthetic materials.

In one example embodiment, typical dimensions for portable folding fence system 1 can be dimensioned as appropriate for the application, but is typically in the 3.5 to 5.5 foot range in vertical height and in the range of 9.5 to 10.5 feet in length, depending on the application.

Figure 11:
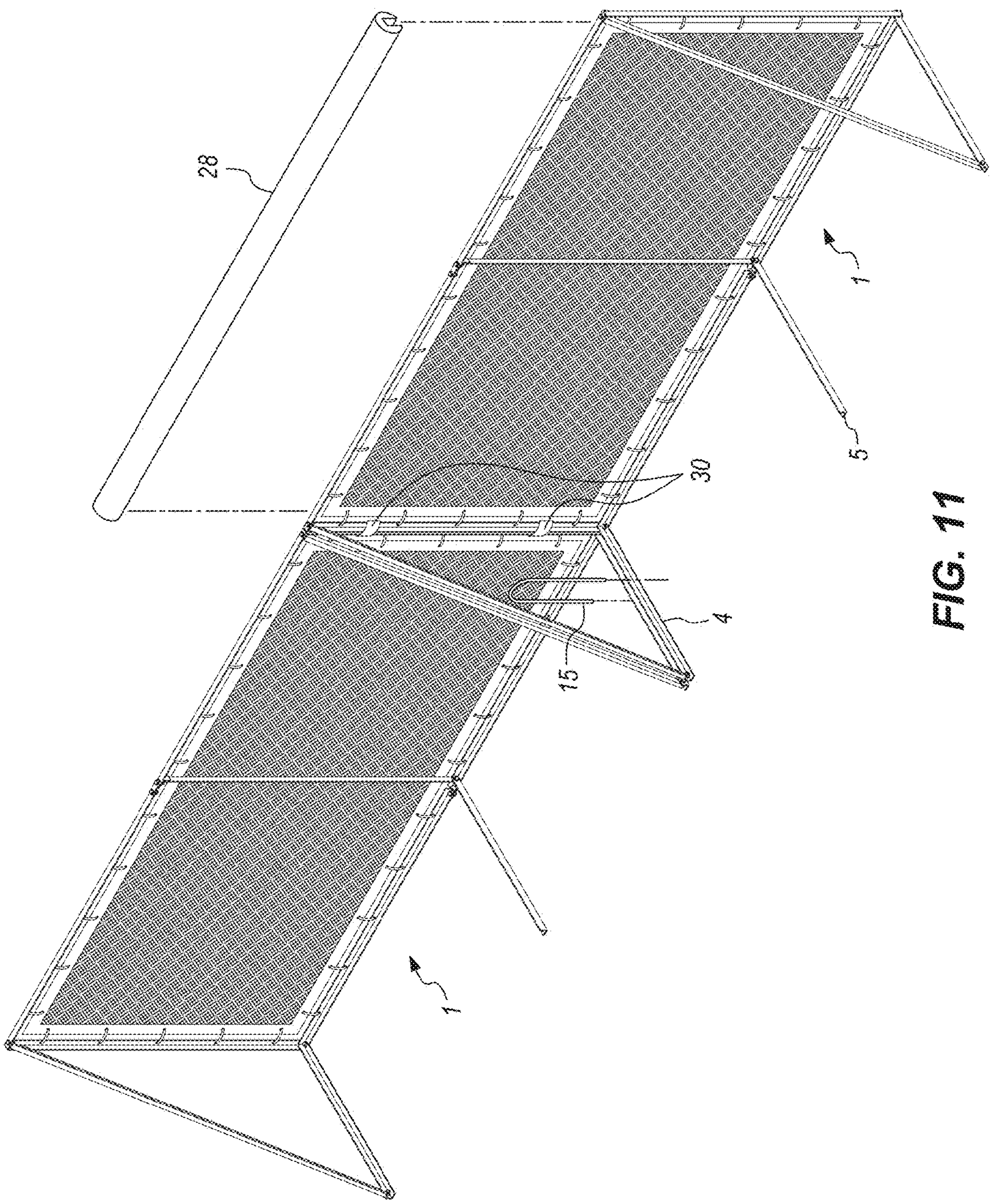
FIG. 11 is a perspective view of one example embodiment of two fully assembled and extended portable fence systems.

In one example embodiment, two or more portable folding fence systems 1 can be connected together for various fencing applications as shown in FIG. 11.

Figure 3:
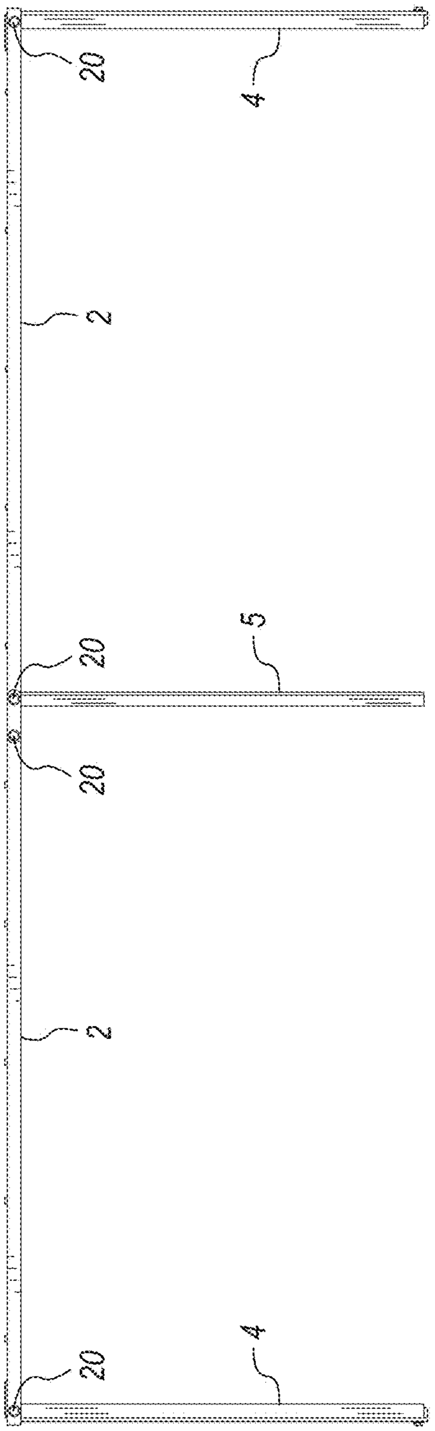
FIG. 3 shows a first top view of one example embodiment of a foldable rigid frame for a portable fence system in the fully extended position with foldout legs and middle bar.
Figure 4:
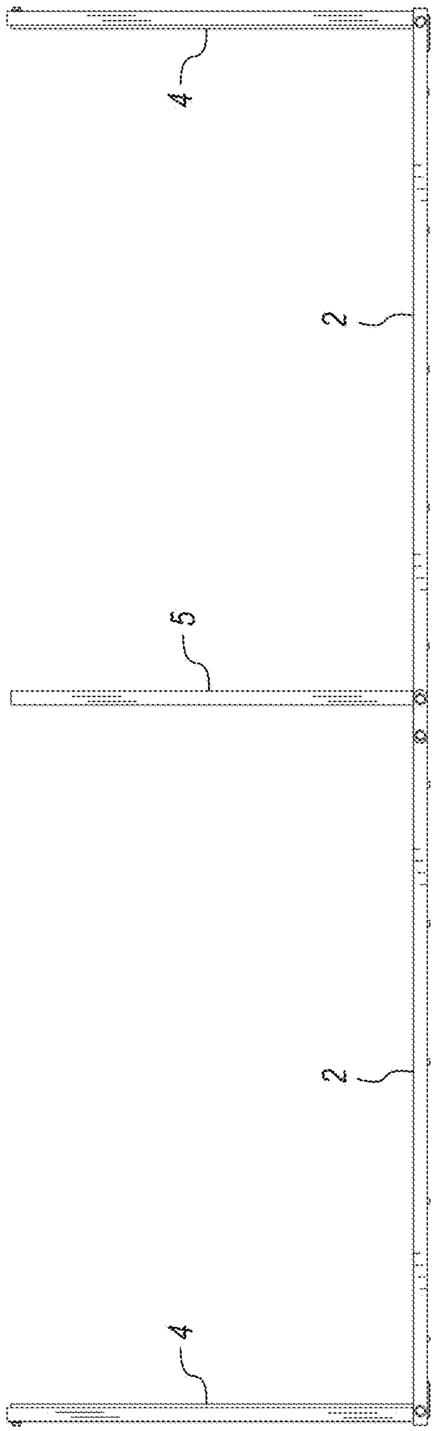
FIG. 4 shows a second top view of one example embodiment of a foldable rigid frame for a portable fence system in the fully extended position with foldout legs and middle bar.
Figure 8:
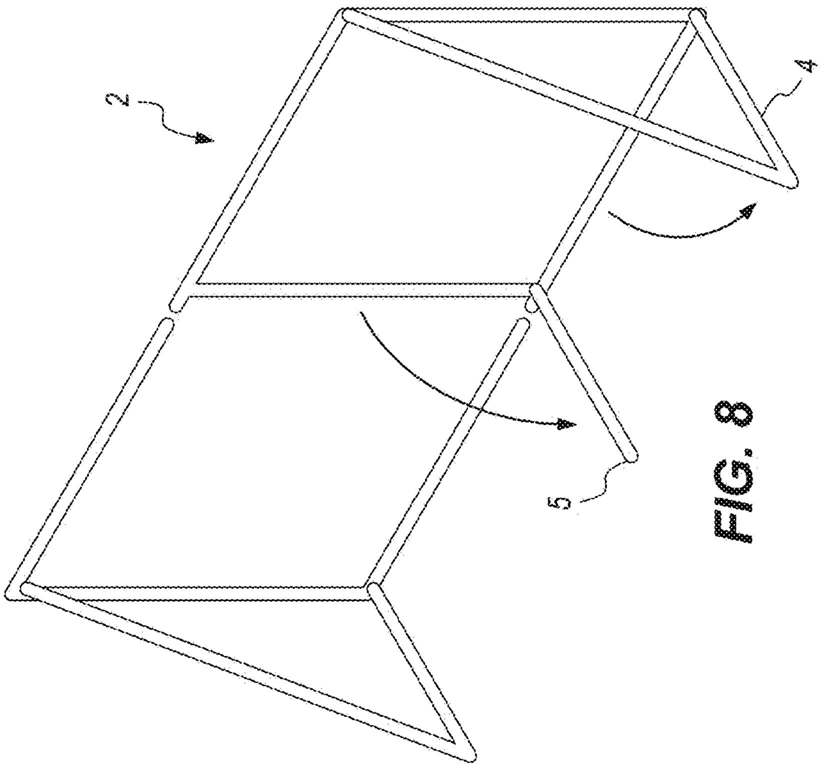
FIG. 8 is a perspective view of one example embodiment of a foldable rigid frame with foldout legs and middle bar for a portable fence system in fully extended position.

FIGS. 3, 4, and 6 show foldable rigid frame 2 in the fully extended position with foldout legs 4 and foldable middle bar 5. Foldout legs 4 are connected to foldable rigid frame 2 with bolts 20 to allow foldout legs 4 to be rotated horizontally at least 90 degrees into foldable rigid frame 2 as shown in FIGS. 8 and 9. Foldable middle bar 5 is also connected to foldable rigid frame 2 with bolts 20 to allow foldable middle bar 5 to be rotated vertically at least 90 degrees into foldable rigid frame 2 as shown in FIGS. 8 and 9.

FIG. 5 shows foldout legs 4 comprising ground bar 11 and support bar 18, and side bar 10 of foldable rigid frame 2.

In one embodiment, foldout leg 4, support bar 18, and side bar 10 of foldable rigid frame 2 are oriented to form a triangle shape. Ground bar 11 is typically placed on the ground or other surface during use.

FIG. 10 shows foldable rigid frame 2 in the fully folded position with foldout legs 4 and foldable middle bar 5 also folded in.

Connection washers 7 and bolts 20 hold first section 12 and second section 14 together as shown in FIG. 6. Bolts 20 can be loosened to allow first section 12 and second section 14 to rotate as shown in FIGS. 8 and 9, and then retightened during use.

FIG. 11 shows two folding fence systems 1 connected together for various fencing applications with top padding 28. The two folding fence systems 1 can be connected together using straps 30. In other applications, more than two portable folding fence systems 1 can be connected together for various fencing applications using straps 30 as shown in FIG. 11 with straps 30 on each end of one or more folding fence systems 1.

FIG. 11 also shows spike 15, such as a wicket-style spike, to secure folding fence system 1 to the ground, such as grass, dirt, or artificial turf by placing spike 15 over foldout legs 4 or foldable middle bar 5.

Folding fence systems 1 can also be used on solid surfaces such as asphalt or concrete by placing weights, sandbags, or other heavy objects on foldout legs 4 or foldable middle bar 5.

Figure 12:
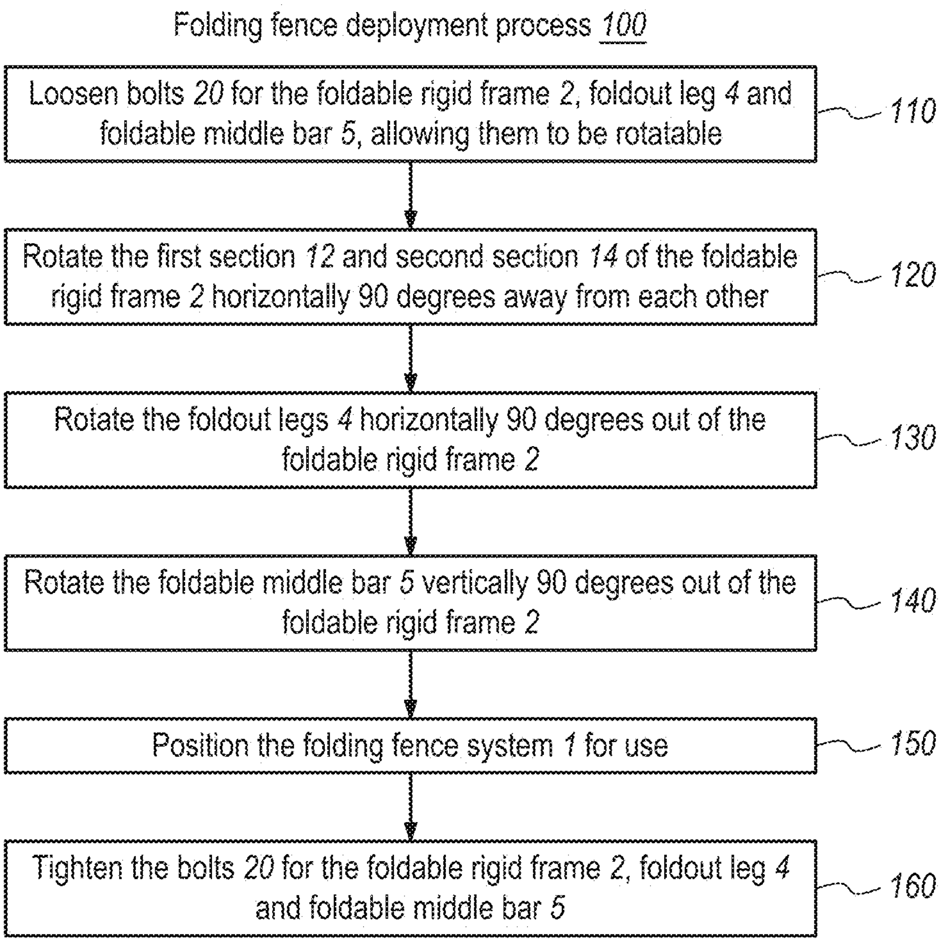
FIG. 12 illustrates an example embodiment of a folding fence deployment process for deploying folding fence system for use at a sporting event, recreational activity, or other application.

FIG. 12 illustrates an example embodiment of folding fence deployment process 100 for deploying folding fence system 1 for use at a sporting event, recreational activity, or other application.

At step 110, bolts 20 are loosened for the foldable rigid frame 2, foldout leg 4 and foldable middle bar 5, allowing them to be rotatable.

At step 120, the first section 12 and second section 14 of the foldable rigid frame 2 are each rotated horizontally 90 degrees away from each other.

At step 130, the foldout legs 4 are rotated horizontally 90 degrees out of the foldable rigid frame 2.

At step 140, the foldable middle bar 5 is rotated vertically 90 degrees out of the foldable rigid frame 2.

At step 150, the folding fence system 1 is positioned for use.

At step 160, the bolts 20 are tightened for the foldable rigid frame 2, foldout leg 4 and foldable middle bar 5.

Figure 13:
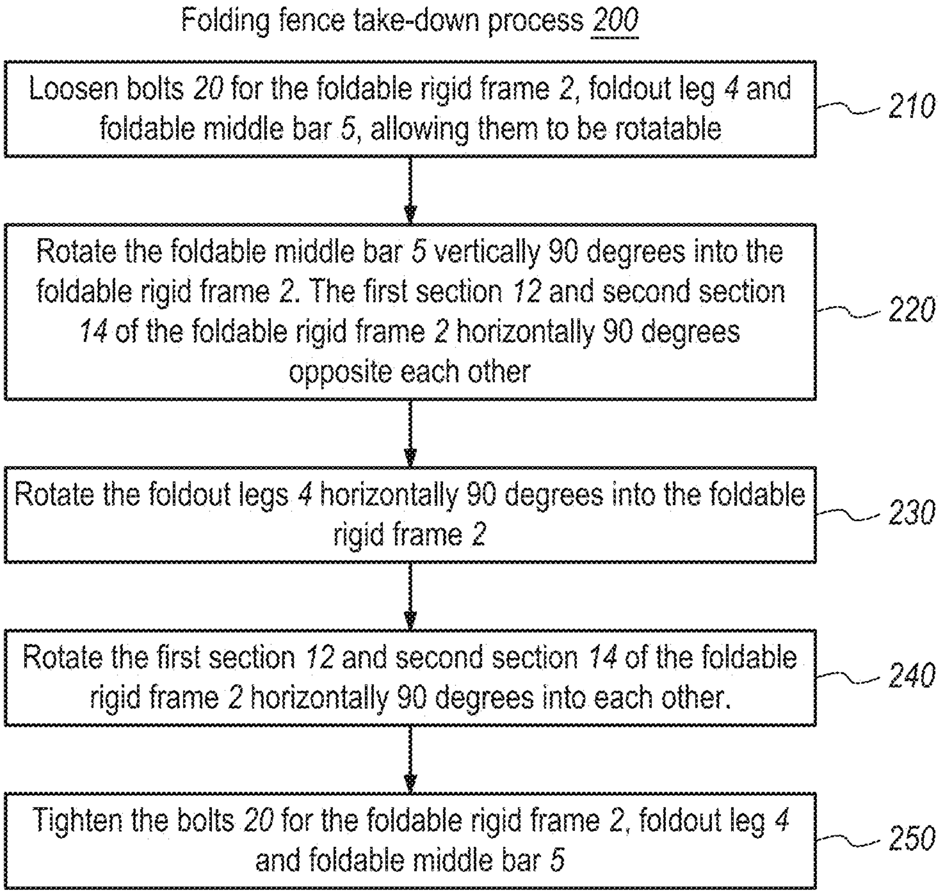
FIG. 13 illustrates an example embodiment of a folding fence take-down process for folding fence system.

FIG. 13 illustrates an example embodiment of folding fence take-down process 200 for folding fence system 1.

At step 210, bolts 20 are loosened for the foldable rigid frame 2, foldout leg 4 and foldable middle bar 5, allowing them to be rotatable.

At step 220, the foldable middle bar 5 is rotated vertically 90 degrees into the foldable rigid frame 2.

At step 230, the foldout legs 4 are rotated horizontally 90 degrees into the foldable rigid frame 2.

At step 240, the first section 12 and second section 14 of the foldable rigid frame 2 are each rotated horizontally 90 degrees towards each other.

At step 250, the bolts 20 are tightened for the foldable rigid frame 2, foldout leg 4 and foldable middle bar 5.

Figure 14:
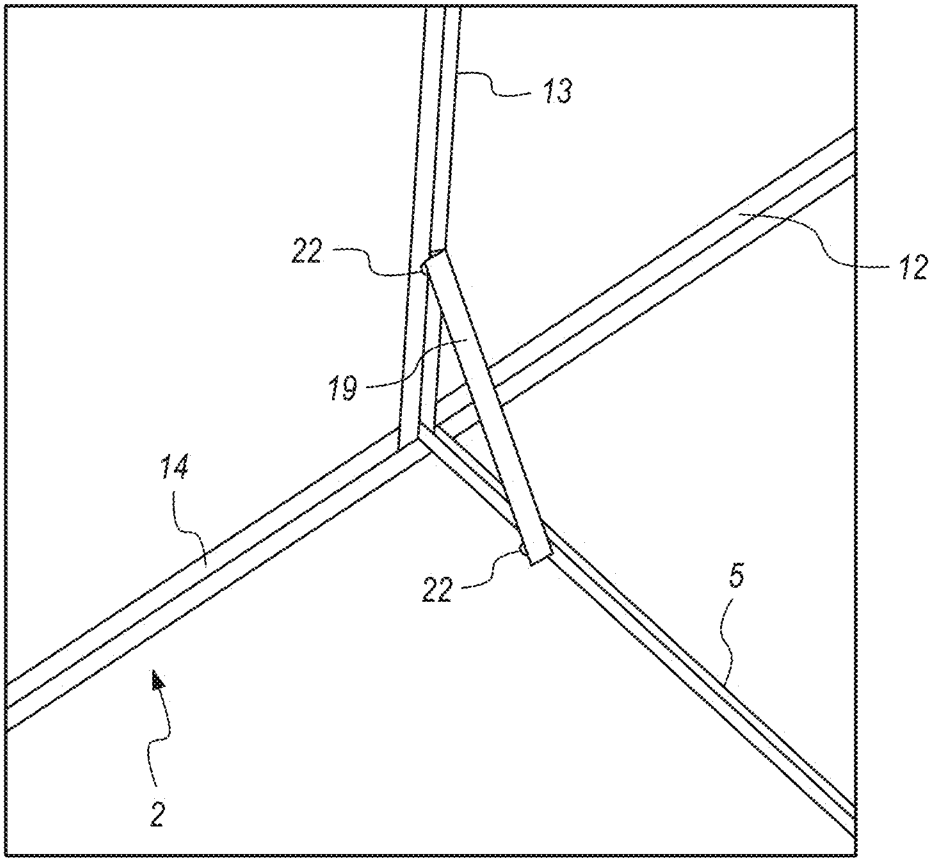
FIG. 14 is a perspective view of one example embodiment of a portable fence system with a support brace for connecting and supporting foldable middle bar to foldable rigid frame.

FIG. 14 shows an embodiment of portable fence system 1 with a support brace 19 for connecting and supporting foldable middle bar 5 to center bar 13 of foldable rigid frame 2. Support brace 19 can be used after folding fence deployment process 100 is used for deploying folding fence system 1 and foldable middle bar 5 is rotated out of the foldable rigid frame 2.

Connection pieces 22 secure support brace 19 to center bar 13 and foldable middle bar 5. In various embodiments, connection pieces 22 and be can bolts or pins.

Figure 15:
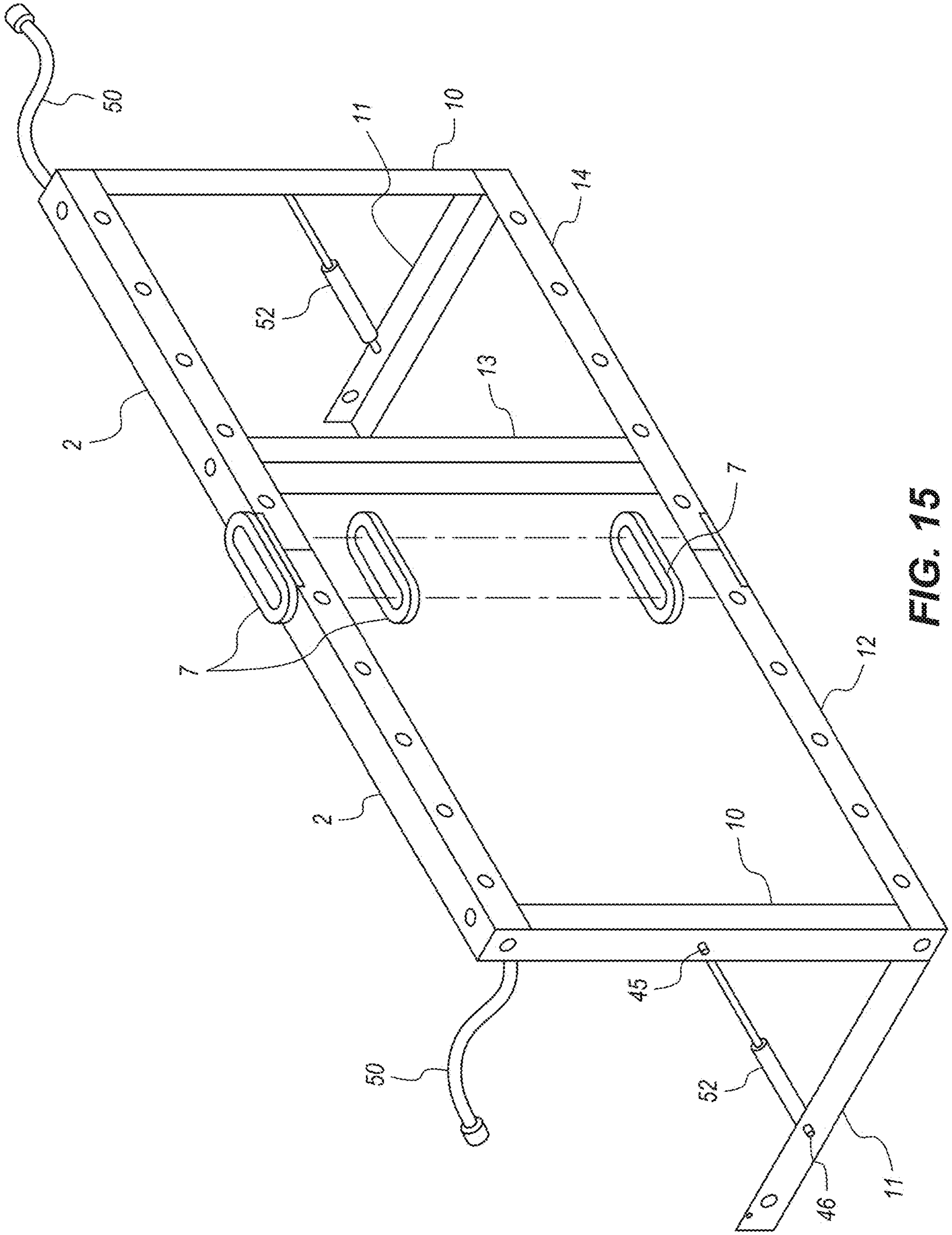
FIG. 15 shows a perspective view of another example embodiment of a portable fence system with a strut and LED light string.

FIG. 15 shows another embodiment of portable fence system 1 with support bar 18 replaced by strut 52. In one embodiment, strut 52 can be a gas piston rod or gas spring. Strut 52 is installed on foldout leg 4 and connected to the side bar 10 of foldable rigid frame 2 through hole 45 in side bar 10 on one end using a nut and bolt or other similar connection mechanism, and is connected to the ground bar 11 of foldout legs 4 though hole 46 on the other end. Strut 52 will allow the fence to bend under pressure, then right itself to its original position, thus enhancing the safety of the fencing system. In one embodiment, strut 52 can be approximately two to three feet in length with approximately one-hundred pounds of compression force.

In another embodiment as shown in FIG. 15, a light 50, such as an LED light string, can be added to foldable rigid frame 2, and in one embodiment can be powered by either battery or solar. In one embodiment, small pin holes along foldable rigid frame 2 can be used to allow some light to filter to the outside, enhancing viewing and safety at night. In one embodiment, the light 50 can be an LED rope light string that is about thirty feet in length with around two-hundred lumens of brightness.

While the invention has been specifically described in connection with certain specific embodiments thereof, it is to be understood that this is by way of illustration and not of limitation. Reasonable variations and modifications are possible within the scope of the foregoing disclosure and drawings without departing from the spirit of the invention.

What is claimed:

1. A portable fence system comprising:
- a foldable rigid frame, wherein the foldable rigid frame comprises:
  - a center bar,
  - a first section,
  - a second section, and
  - wherein the first section and the second section are connected together with a plurality of bolts and at least one large connection washer to allow the first section and the second section to each rotate horizontally relative to each other;
- a flexible barrier netting, wherein the flexible bearing netting is attached to the foldable rigid frame at regular intervals;
- a foldout leg at each end of the foldable rigid frame, wherein each foldout leg is connected to the foldable rigid frame with one or more bolts to allow the foldout leg to be rotated horizontally into and out of the foldable rigid frame;
- a strut connected to the foldout leg and the foldable rigid frame; and
- a foldable middle bar towards a middle of the foldable rigid frame, wherein the foldable middle bar is connected to the foldable rigid frame with one or more bolts to allow the foldable middle bar to be rotated vertically into and out of the foldable rigid frame.

2. The portable fence system of claim 1 further comprising a spike to secure the folding fence system to the ground.

3. The portable fence system of claim 1 further comprising a top padding.

4. The portable fence system of claim 1 further comprising a plurality of connectors to connect the flexible barrier netting to the foldable rigid frame.

5. The portable fence system of claim 4 wherein the plurality of connectors comprises a plurality of plastic connectors.

6. The portable fence system of claim 1 wherein the flexible barrier netting is constructed with a synthetic polymer.

7. The portable fence system of claim 1 wherein the foldable rigid frame is constructed with galvanized steel.

8. The portable fence system of claim 1 wherein the foldable rigid frame is constructed with powder coated steel.

9. The portable fence system of claim 1 further comprising a support brace, wherein the support brace is connected to the foldable middle bar and the center bar.

10. The portable fence system of claim 1 further comprising an LED light string.

11. A portable fence system comprising:
- a foldable rigid frame, wherein the foldable rigid frame comprises:
  - a center bar,
  - a first section,
  - a second section, and
  - wherein the first section and the second section are connected together with a plurality of bolts and at least one large connection washer to allow the first section and the second section to each rotate horizontally relative to each other;
- a flexible barrier netting, wherein the flexible bearing netting is attached to the foldable rigid frame at regular intervals;
- a foldout leg at each end of the foldable rigid frame, wherein each foldout leg is connected to the foldable rigid frame with one or more bolts to allow the foldout leg to be rotated horizontally into and out of the foldable rigid frame; and
- a foldable middle bar towards a middle of the foldable rigid frame, wherein the foldable middle bar is connected to the foldable rigid frame with one or more bolts to allow the foldable middle bar to be rotated vertically into and out of the foldable rigid frame.

12. The portable fence system of claim 11 further comprising a spike to secure the folding fence system to the ground.

13. The portable fence system of claim 11 further comprising a top padding.

14. The portable fence system of claim 11 further comprising a plurality of connectors to connect the flexible barrier netting to the foldable rigid frame.

15. The portable fence system of claim 14 wherein the plurality of connectors comprises a plurality of plastic connectors.

16. The portable fence system of claim 11 wherein the flexible barrier netting is constructed with a synthetic polymer.

17. The portable fence system of claim 11 wherein the foldable rigid frame is constructed with galvanized steel.

18. The portable fence system of claim 11 wherein the foldable rigid frame is constructed with powder coated steel.

19. The portable fence system of claim 11 further comprising a support brace, wherein the support brace is connected to the foldable middle bar and the center bar.

20. The portable fence system of claim 11 further comprising an LED light string.

* * * * *